US011073825B2

(12) United States Patent
Fujitsuka

(10) Patent No.: US 11,073,825 B2
(45) Date of Patent: Jul. 27, 2021

(54) CAUSAL RELATIONSHIP LEARNING METHOD, PROGRAM, DEVICE, AND ANOMALY ANALYSIS SYSTEM

(71) Applicant: NEC CORPORATION, Tokyo (JP)

(72) Inventor: Masashi Fujitsuka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 101 days.

(21) Appl. No.: 16/608,241

(22) PCT Filed: Apr. 27, 2017

(86) PCT No.: PCT/JP2017/016729
§ 371 (c)(1),
(2) Date: Oct. 25, 2019

(87) PCT Pub. No.: WO2018/198267
PCT Pub. Date: Nov. 1, 2018

(65) Prior Publication Data
US 2020/0192342 A1    Jun. 18, 2020

(51) Int. Cl.
*G05B 23/02*        (2006.01)
(52) U.S. Cl.
CPC ..... *G05B 23/0248* (2013.01); *G05B 23/0221* (2013.01); *G05B 23/0278* (2013.01)
(58) Field of Classification Search
None
See application file for complete search history.

(56) References Cited

U.S. PATENT DOCUMENTS

2013/0132000 A1    5/2013    Tamaki et al.

FOREIGN PATENT DOCUMENTS

| JP | 05-143153 A | 6/1993 |
| JP | 2001-100835 A | 4/2001 |
| JP | 2011-243118 A | 12/2011 |
| JP | 2017-021702 A | 1/2017 |
| WO | 2016147656 A1 | 9/2016 |

OTHER PUBLICATIONS

George Sugihara et al., "Detecting Causality in Complex Ecosystems", Science, Oct. 26, 2012, pp. 496-500, vol. 338.
International Search Report of PCT/JP2017/016729 dated Jul. 25, 2017 [PCT/ISA/210].
Communication dated Oct. 29, 2020 from the Japanese Patent Office in Application No. 2019-514985.

*Primary Examiner* — Carlos R Ortiz Rodriguez
(74) *Attorney, Agent, or Firm* — Sughrue Mion, PLLC

(57) ABSTRACT

The present invention provides a method, a program, and a device that can accurately learn a causal relationship in a deterministic system and a system that performs anomaly analysis by using the causal relationship. A causal relationship learning device according to one example embodiment of the present invention includes: a correlation determination unit that determines a correlation between measurement values measured by two sensors; and a low correlation causal relationship estimation unit that, when the correlation is lower than a predetermined reference, determines a causal relationship between the two sensors by estimating one of the measurement values which is a cause from the other of the measurement values which is a result.

9 Claims, 7 Drawing Sheets

CAUSAL RELATIONSHIP LEARNING METHOD, PROGRAM, DEVICE, AND ANOMALY ANALYSIS SYSTEM

CROSS REFERENCE TO RELATED APPLICATIONS

This application is a National Stage of International Application No. PCT/JP2017/016729, filed Apr. 27, 2017.

TECHNICAL FIELD

The present invention relates to a method, a program, and a device for learning a causal relationship between sensors and to a system that performs anomaly analysis by using the causal relationship.

BACKGROUND ART

In a facility of a factory (plant), various types of sensors used for measuring a temperature, a pressure, a flowrate, or the like are provided, and the measurement values of the sensors are monitored by a monitoring system. When an anomaly occurs in a factory, the measurement values of a plurality of sensors often becomes abnormal values at the same time because the anomaly affects various facilities or environments. To resolve the anomaly, it is necessary to identify a cause of the anomaly, however, when the operator visually references the measurement values of a plurality of sensors to identify the cause of the anomaly, the operator may make a mistake in determination or take time for determination due to the operator's ability or experience. Thus, there is a demand for a technology that can automatically identify the cause of an anomaly.

Patent literature 1 discloses an art in which a causal relationship of a failure is set in advance in a control device, and when a failure occurs, a cause of the failure is identified based on the causal relationship set in advance. Such an art can automatically identify the cause of the anomaly without relying on the operator's ability or experience.

CITATION LIST

Patent Literature

PTL 1: Japanese Patent Application Laid-Open No. H5-143153

Non Patent Literature

NPL 1: Sugihara et al., "Detecting Causality in Complex Ecosystems", Science, Oct. 26, 2012, Vol. 338, Issue 6106, pp. 496-500

SUMMARY OF INVENTION

Technical Problem

In the art disclosed in Patent literature 1, however, since the causal relationship is set based on human experience, an incorrect causal relationship may be set, and particularly in a large-scale factory, it may be difficult to construct a causal relationship based on human experience because the number of sensors is enormous.

It is conceivable to set a causal relationship by using a causal relationship estimation method (causal reasoning) without relying on human experience. For example, a causal relationship estimation method using Granger causality and a causal relationship estimation method using motion entropy are known.

However, although the causal relationship estimation method using Granger causality and the causal relationship estimation method using motion entropy are effective for a system in which a probability factor is large, a system in which a deterministic factor (that is, a factor that can be described by an equation of motion) is large is unable to estimate a causal relationship at high accuracy. In addition, since the causal relationship estimation method using Granger causality is targeted for linear relationships, it is difficult to apply it to a factory in which a nonlinear relationship exists. Moreover, since the causal relationship estimation method using motion entropy has a large amount of calculation, it is difficult to be apply it to a large-scale factory in which the number of sensors is enormous.

The present invention has been made in view of the problems described above and intends to provide a method, a program, and a device that can learn causal relationships at high accuracy and a system that performs anomaly analysis by using the causal relationship in a deterministic system.

Solution to Problem

A first example aspect of the present invention is a causal relationship learning device including: a determination unit that determines a correlation between measurement values measured by two sensors; and an estimation unit that, when the correlation is lower than a predetermined reference, determines a causal relationship between the two sensors by estimating one of the measurement values which is a cause from the other of the measurement values which is a result.

A second example aspect of the present invention is an anomaly analysis system including: a determination unit that determines a correlation between measurement values measured by two sensors; an estimation unit that, when the correlation is lower than a predetermined reference, determines a causal relationship between the two sensors by estimating one of the measurement values which is a cause from the other of the measurement values which is a result; a detection unit that detects an anomaly from the measurement values; and an identifying unit that identifies a sensor which is a cause of the anomaly based on the causal relationship including a sensor from which the anomaly is detected.

A third example aspect of the present invention is a causal relationship learning method including: determining a correlation between measurement values measured by two sensors; and when the correlation is lower than a predetermined reference, determining a causal relationship between the two sensors by estimating one of the measurement values which is a cause from the other of the measurement values which is a result.

A fourth example aspect of the present invention is a causal relationship learning program that causes a computer to perform: determining a correlation between measurement values measured by two sensors; and when the correlation is lower than a predetermined reference, determining a causal relationship between the two sensors by estimating one of the measurement values which is a cause from the other of the measurement values which is a result.

Advantageous Effects of Invention

According to the present invention, a causal relationship can be learned at high accuracy and a cause of an anomaly can be analyzed using the causal relationship in a deterministic system.

DESCRIPTION OF EMBODIMENTS

Figure 1:
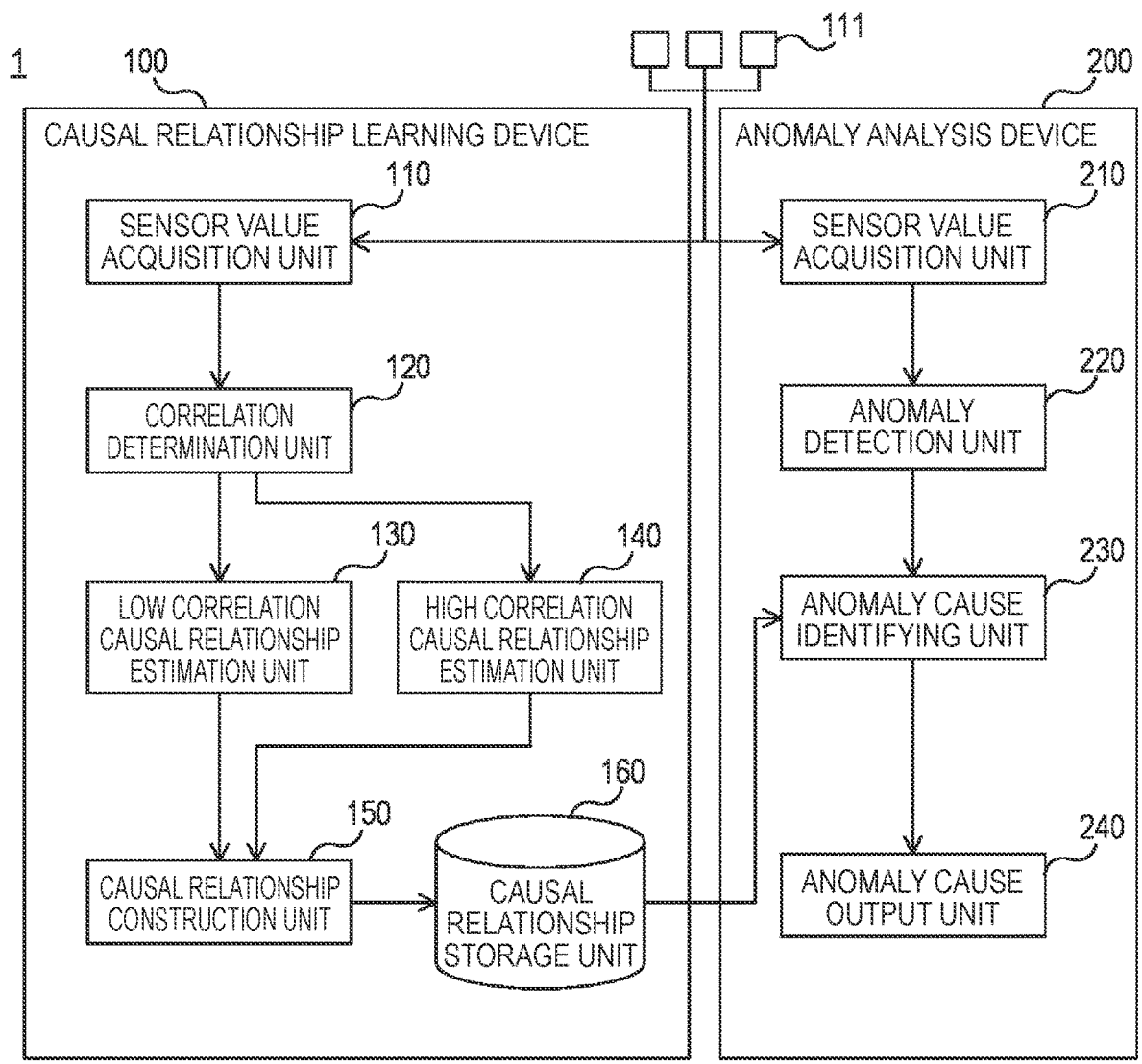
FIG. 1 is a block diagram of an anomaly analysis system according to an example embodiment.

While an example embodiment of the present invention will be described below with reference to the drawings, the present invention is not limited to the example embodiment. Note that, in the drawings described below, components having the same function are labeled with the same references, and repeated description thereof may be omitted.

Example Embodiment

FIG. 1 is a block diagram of an anomaly analysis system 1 according to the present example embodiment. In FIG. 1, arrows represent main dataflows, and there may be other dataflows than those illustrated in FIG. 1. In FIG. 1, each block illustrates a configuration in a unit of function rather than in a unit of hardware (device). Therefore, the block illustrated in FIG. 1 may be implemented in a single device or may be implemented separately in a plurality of devices. Transfer of the data between blocks may be performed via any entity, such as a data bus, a network, a portable storage medium, or the like.

The anomaly analysis system 1 has a causal relationship learning device 100 and an anomaly analysis device 200. The causal relationship learning device 100 includes, as a processing unit, a sensor value acquisition unit 110, a correlation determination unit 120, a low correlation causal relationship estimation unit 130, a high correlation causal relationship estimation unit 140, and a causal relationship construction unit 150. Further, the causal relationship learning device 100 has, as a storage unit, a causal relationship storage unit 160. The anomaly analysis device 200 has, as a processing unit, a sensor value acquisition unit 210, an anomaly detection unit 220, an anomaly cause identifying unit 230, and an anomaly cause output unit 240.

The causal relationship learning device 100 learns a causal relationship between sensors 111 from measurement values obtained by the sensors 111. The sensor value acquisition unit 110 acquires information indicating time series measurement values (sensor values) measured by two or more sensors 111 provided in a factory (plant). The sensor value acquisition unit 110 may sequentially receive sensor values from the sensors 111 or may collectively receive sensor values measured in a predetermined time range. Further, the sensor value acquisition unit 110 may read sensor values of the sensors 111 stored in the causal relationship learning system 100 in advance. The sensor 111 is any sensor that measures information on a facility or an environment of a factory, such as a temperature sensor, a vibration sensor, a pressure sensor, a concentration sensor, a revolution speed sensor, or the like. The sensors 111 may include one or multiple types of sensors, or the same type of sensors may be provided in a plurality of places. Each of the sensors 111 is determined and managed in accordance with the type and the installation place thereof.

The correlation determination unit 120, the low correlation causal relationship estimation unit 130 (first estimation unit), and the high correlation causal relationship estimation unit 140 (second estimation unit) estimate a causal relationship of each pair of the sensors 111 by performing a causal relationship estimation process as described below using sensor values acquired by the sensor value acquisition unit 110. The causal relationship construction unit 150 then aggregates respective pairs of causal relationships of the sensors 111 estimated by the low correlation causal relationship estimation unit 130 and the high correlation causal relationship estimation unit 140 and stores respective aggregated pairs as causal relationships of the entire sensors 111 in the causal relationship storage unit 160. The causal relationship is stored in any data format (file format) in the causal relationship storage unit 160.

The anomaly analysis device 200 analyses an anomaly cause based on a causal relationship learned by the causal relationship learning device 100. The sensor value acquisition unit 210 acquires information indicating sensor values from the sensors 111 as with the sensor value acquisition unit 110.

The anomaly detection unit 220 detects an anomaly when a sensor value acquired by the sensor value acquisition unit 210 exhibits different behavior from that in a normal state. Detection of an anomaly from the sensor value is performed by a well-known anomaly detection method. Further, the anomaly detection unit 220 may detect an anomaly by receiving an anomaly detection result from an external anomaly detection system. When an anomaly is detected, the anomaly detection unit 220 extracts anomaly information indicating the sensor 111 from which the anomaly is detected and occurrence time of the anomaly.

When there are multiple sensors 111 from which an anomaly is detected, the sensor 111 that corresponds to the cause of the anomaly is identified by the anomaly cause identifying unit 230. The anomaly cause identifying unit 230 reads the causal relationship including the sensor 111 from which an anomaly is detected from the causal relationship storage unit 160 of the causal relationship learning device 100. The anomaly cause identifying unit 230 then identifies the most upstream sensor 111 in the causal relationship as the cause of the anomaly. That is, the anomaly cause identifying unit 230 traces back, in the direction of the cause, the causal relationship including the sensor 111 from which the anomaly is detected and considers the sensor 111 that is no longer traced back as the cause of the anomaly.

The anomaly cause output unit 240 outputs information indicating the sensor 111 that is the cause of an anomaly identified by the anomaly cause identifying unit 230 in any scheme such as display by a display, paper printing by a printer, and data storage to a storage device.

Figure 2:
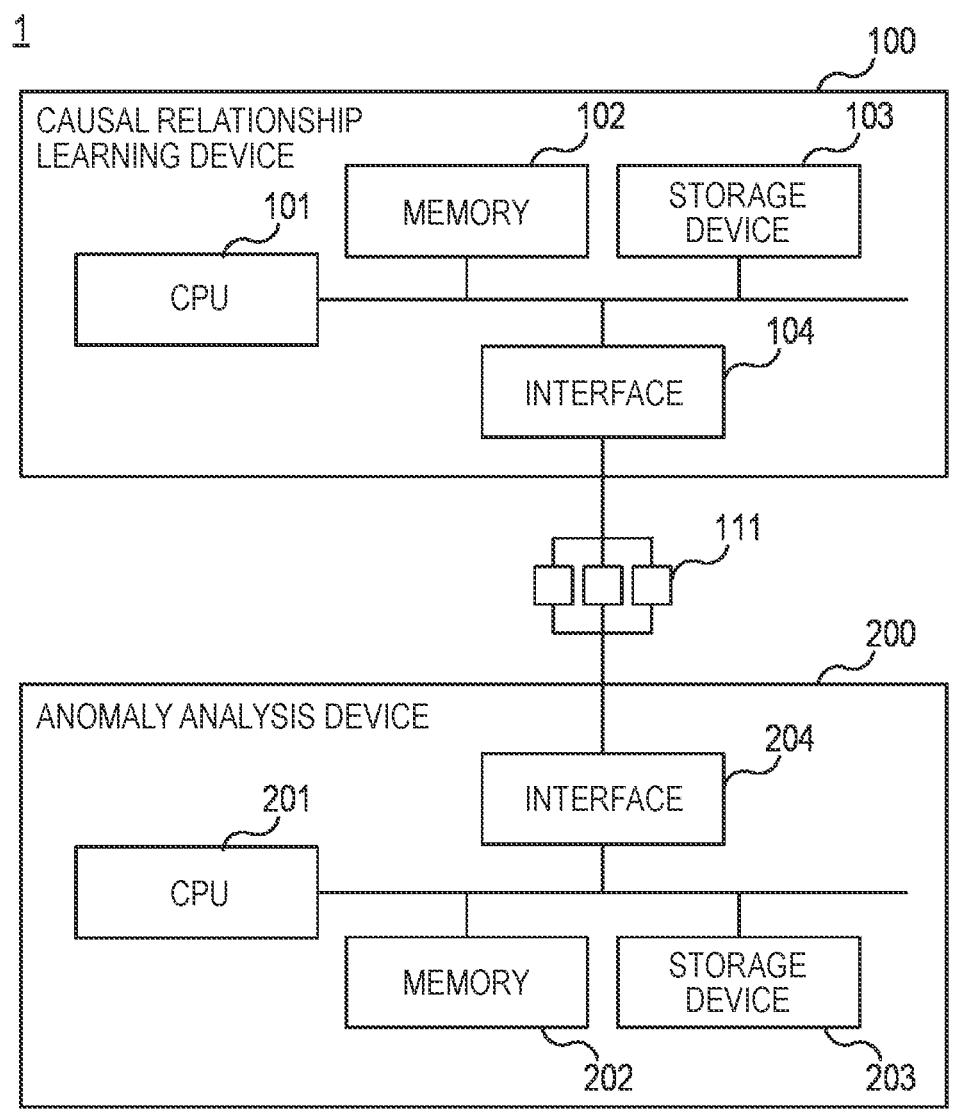
FIG. 2 is a general configuration diagram of the anomaly analysis system according to the example embodiment.

FIG. 2 is a general configuration diagram illustrating an exemplary device configuration of the anomaly analysis system 1 according to the present example embodiment. The causal relationship learning device 100 has a central processing unit (CPU) 101, a memory 102, a storage device 103, and an interface 104. The anomaly analysis device 200 has a CPU 201, a memory 202, a storage device 203, and an interface 204.

Each of the interfaces 104 and 204 is a communication unit that transmits and receives data and is configured to be able to perform at least one of the communication schemes of wired communication and wireless communication. Each of the interfaces 104 and 204 includes a processor, an electric circuit, an antenna, a connection terminal, or the like required for the above communication scheme. Each of the interfaces 104 and 204 performs communication by using a communication scheme in accordance with a signal from the CPU 101 or 201. Each of the interfaces 104 and 204 receives, from the sensors 111, information indicating measurement values of the sensors 111, for example.

The storages devices 103 and 203 store programs executed by the causal relationship learning device 100 and the anomaly analysis device 200, data of a process result obtained by the program, or the like. Each of the storages devices 103 and 203 includes a read only memory (ROM) dedicated to reading, a hard disk drive or a flash memory that is readable and writable, or the like. Further, each of the storage devices 103 and 203 may include a computer readable portable storage medium such as a CD-ROM. Each of the memories 102 and 202 includes a random access memory (RAM) or the like that temporarily stores data being processed by the CPU 101 or 201 or a program and data read from the storage device 103 or 203.

Each of the CPUs 101 and 201 is a processor as a processing unit that temporarily stores temporary data used for processing in the memory 102 or 202, reads a program stored in the storage device 103 or 203, and performs various processing operations such as calculation, control, determination, or the like on the temporary data in accordance with the program. Further, each of the CPUs 101 and 201 stores data of a process result in the storage device 103 or 203 and also transmits data of the process result externally via the interface 104 or 204.

In the present example embodiment, the CPU 101 of the causal relationship learning device 100 functions as the sensor value acquisition unit 110, the correlation determination unit 120, the low correlation causal relationship estimation unit 130, the high correlation causal relationship estimation unit 140, and the causal relationship construction unit 150 of FIG. 1 by executing the program stored in the storage device 103. Further, the storage device 103 of the causal relationship learning device 100 functions as the causal relationship storage unit 160 of FIG. 1. The CPU 201 of the anomaly analysis device 200 functions as the sensor value acquisition unit 210, the anomaly detection unit 220, the anomaly cause identifying unit 230, and the anomaly cause output unit 240 of FIG. 1.

The anomaly analysis system 1 is not limited to the specific configuration illustrated in FIG. 2. The causal relationship learning device 100 and the anomaly analysis device 200 are not limited to a single device and may be configured such that two or more physically separated devices are connected by wired or wireless connection, respectively. The causal relationship learning device 100 and the anomaly analysis device 200 may be integrally configured as a single device. Each unit included in the causal relationship learning device 100 and the anomaly analysis system 200 may be implemented by an electric circuitry. The electric circuitry here is a term conceptually including a single device, multiple devices, a chipset, or a cloud.

Further, at least a part of the anomaly analysis system 1 may be provided in a form of Software as a Service (SaaS). That is, at least some of the functions for implementing the anomaly analysis system 1 may be performed by software executed via a network.

Figure 3:
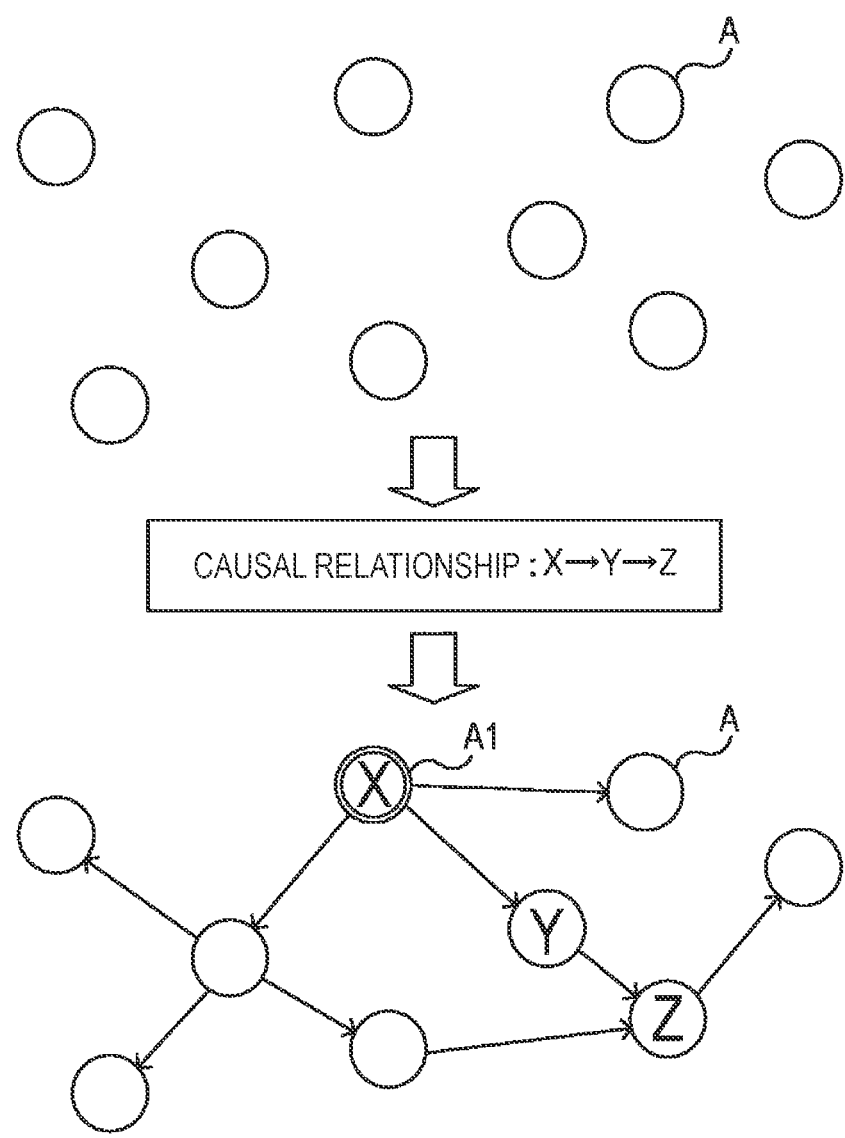
FIG. 3 is a schematic diagram illustrating a causal relationship used in the example embodiment.
Figure 4:
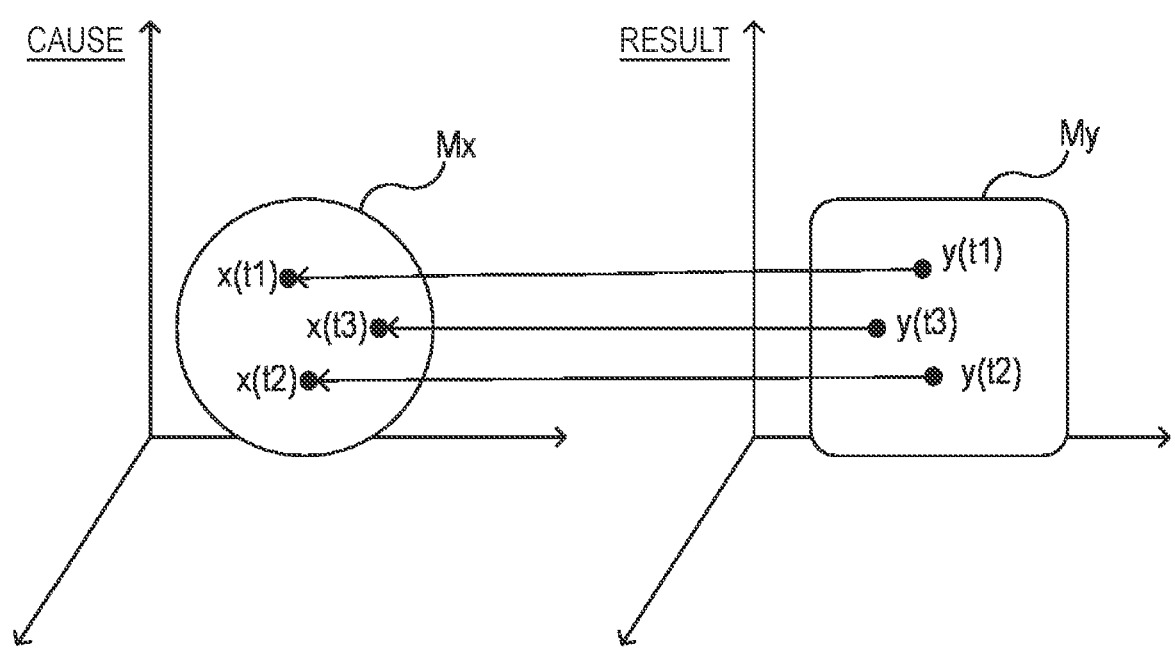
FIG. 4 is a schematic diagram illustrating CCM used in the example embodiment.

The causal relationship estimation processing performed by the correlation determination unit 120, the low correlation causal relationship estimation unit 130, and the high correlation causal relationship estimation unit 140 is illustrated by using FIG. 3 and FIG. 4. FIG. 3 is a schematic diagram illustrating a causal relationship used in the present example embodiment. Elements A (the sensors 111 of the present example embodiment) from which an anomaly is detected is indicated in the upper stage of FIG. 3. In such a way, when an anomaly is detected in many elements A, it is not possible to know which of the elements A causes the anomaly.

A state where a causal relationship that has learned in advance is applied to the element A from which an anomaly is detected is indicated in the lower stage of FIG. 3. In the example of FIG. 3, when the causal relationship of X to Y to Z (the left side of the arrow indicates a cause and the right side indicates a result) for the variables X, Y, and Z has been learned in advance, the causal relationship of the elements A corresponding to the variables X, Y, and Z is known. By tracing back the causal relationship generated in such a way in the cause direction, it is possible to determine that the element A corresponding to the variable X in the most upstream is a cause A1 of the anomaly. To identify a cause of an anomaly, the causal relationship learning device 100 learns a causal relationship from the sensor value of the sensors 111 in a normal state in advance.

FIG. 4 is a schematic diagram illustrating Convergent Cross Mapping (CCM) used in the present example embodiment. The CCM is an analysis method disclosed in Non Patent Literature 1. While being used for analysis of an ecosystem in Non Patent Literature 1, the CCM is applied to analysis of sensor values measured in a factory in the present example embodiment.

A dynamical system is established by variables and a time evolution equation therebetween, and the state is determined when values of the variables are determined, and the state changes with the time evolution equation. The system settles down to a certain state after a sufficient amount of time elapses, and the subspace thereof is referred to as an attractor (but a divergent system is not considered here).

Since a certain variable forming the system is a result of being affected by another variable, the time series information on the certain variable also includes information of another variable. Therefore, it is known that the whole information can be reconstructed from some of the variables forming the system. Such a reconstructed attractor is referred to as a reconstructed attractor.

It is considered that a causal relationship (that is, X to Y) in which the variable X is a cause and the variable Y is a result. FIG. 4 illustrates an attractor Mx of the variable X and an attractor My of the variable Y. In FIG. 4, while being represented in a three-dimensional space for better visibility, the attractors Mx and My are represented practically in any dimension. At this time, when partial behavior of the variable Y, which is the result, is similar at different time, the partial behavior of the corresponding time of the variable X, which is the cause, will also be similar.

In other words, as illustrated in FIG. 4, when vectors y (t1), y (t2), and y (t3) in a certain time range in the resultant variable Y are close, the vectors x (t1), x (t2), and x (t3) in the corresponding time range in the cause variable X are also close. On the other hand, since the result is produced by influence of various causes, even when the cause variables X are close, the resultant variables Y are not always close. The CCM is a method of determining the presence or absence of a causal relationship at high accuracy by estimating a cause from a result in two variables using such an asymmetric nature of the cause and the result.

However, the CCM may make erroneous estimation when the correlation between two variables is high. As described above, the CCM determines the causal relationship by estimating a cause from a result, and when the correlation between variables is high, estimation of a result from a cause is facilitated. As a result, since the asymmetric nature of a cause and a result is no longer useful, the CCM is unable to make accurate estimate. For example, for two variables having a high correlation, the CCM may erroneously estimate that there is a bidirectional causal relationship in which the two variables are mutually a cause and a result even though there is a unidirectional causal relationship between the two variables in fact.

Accordingly, with a countermeasure described below, the causal relationship learning device 100 according to the present example embodiment learns a causal relationship at high accuracy by using the CCM that is a causal estimation method that determines a causal relationship by estimating a cause from a result.

The correlation determination unit 120 determines the correlation between sensor values of the two sensors 111 using the sensor values acquired by the sensor value acquisition unit 110. In the present example embodiment, a correlation is determined by applying sensor values to the polynomial model. The sensor value of one sensor 111 at certain time t is variable $X_t$, and the sensor value of the other sensor 111 at the same time t is variable $Y_t$. First, the correlation determination unit 120 applies a polynomial model indicated in Equation (1) to variables $X_t$ and $Y_t$ by using time series data $\{X_t\}$ and $\{Y_t\}$ of the sensor values acquired from the sensors 111.

[Math. 1]

$$Y'_t = g(X_{t-1}) = \sum_{n=0}^{N} a_n X_{t-1}^n \quad (1)$$

Here, $Y'_t$ is an estimate value of $Y_t$, N is the order, and a is a coefficient. The order N is set to an appropriate value by cross validation.

The correlation determination unit 120 calculates an error between the estimate value $Y'_t$ and the estimate value $Y_t$ as a correlation index. The correlation determination unit 120 then determines that the two sensors 111 that output variables $X_t$ and $Y_t$ have a high correlation if the error is less than or equal to a predetermined threshold (or less than the predetermined threshold) and, otherwise, determines that the two sensors 111 have a low correlation. The correlation determination unit 120 determines the correlation for each pair of the sensors 111. The method of determining a correlation between the measurement values of the sensors 111 is not limited to the specific equation illustrated here, and any other methods may be used.

The causal relationship learning device 100 according to the present example embodiment applies different causal relationship estimate methods for respective pairs of the sensors 111 in accordance with a correlation determined by the correlation determination unit 120. Specifically, the causal relationship learning device 100 determines the causal relationship using the CCM for a pair of the sensors 111 whose correlation is lower than a predetermined reference (that is, the error of the model is lower than or equal to a predetermined threshold or lower than the predetermined threshold). On the other hand, for a pair of the sensors 111 whose correlation is higher than the predetermined reference (that is, the error of the model is higher than a predetermined threshold or higher than or equal to the predetermined threshold), the causal relationship learning device 100 determines the causal relationship by comparing bidirectional polynomial models, because the CCM may make erroneous determination on the causal relationship.

The low correlation causal relationship estimation unit 130 determines a causal relationship by using the CCM for a pair of the sensors 111 determined as a low correlation by the correlation determination unit 120. To determine a causal relationship in which the variable X is a cause and the variable Y is a result (that is, X to Y), a scheme called simplex projection is used. Specifically, first, the low correlation causal relationship estimation unit 130 prepares E+1 nearest neighbor delay vectors $\{y(t_1), y(t_2), \ldots, y(t_{E+1})\}$ of the delay vector y(t) from the time series data $\{Yt\}$ of the variable Y on the result side. The number of nearest neighbor delay vectors is appropriately set. The time of each vector is labeled with 1 to E+1 in ascending order of closeness to y(t).

Next, the low correlation causal relationship estimation unit 130 calculates an estimation value $X'_t$ from time series data $\{Xt\}$ of the variable X on the cause side corresponding to the time of the E+1 nearest neighbor delay vectors of y(t) by using Equation (2) below.

[Math. 2]

$$X'_t = \sum_{i=0}^{E+1} w_i X_{t_i} \quad (2)$$

Here, $w_i$ is a weight in accordance with each distance on the reconfiguration attractor and is expressed by Equation (3) below.

[Math. 3]

$$w_i = \frac{u_i}{\sum_{j=1}^{E+1} u_j}, \quad u_i = \exp\left(-\frac{\|x(t) - x(t_i)\|}{\|x(t) - x(t_1)\|}\right) \quad (3)$$

Here, $\|\cdot\|$ denotes a Euclid norm on E-th order space. That is, since the CCM uses a nature in which cause variables are close when resultant variables are close as described above, Equations (2) and (3) perform estimation by taking a weighted average in accordance with a distance between variables.

The low correlation causal relationship estimation unit 130 calculates the estimation value $X'_t$ at all time and takes a correlation coefficient between time series estimation value $\{X'_t\}$ and time series measurement value $\{X_t\}$ by using Equation (4).

[Math. 4]

$$\rho = \frac{\sum_t (X_t - \overline{X})(X'_t - \overline{X'})}{\sqrt{\sum_t (X_t - \overline{X})^2 \sum_t (X'_t - \overline{X'})^2}} \qquad (4)$$

This correlation coefficient is denoted as an index ρ of the strength of cause and effect.

The low correlation causal relationship estimation unit 130 determines the presence or absence of a causal relationship of X to Y by using the calculated index ρ. For example, the low correlation causal relationship estimation unit 130 compares the index ρ of X to Y with a first threshold, determines that the causal relationship of X to Y is present if the index ρ is greater than the first threshold (or greater than or equal to the first threshold), and determines that the causal relationship of X to Y is absent if the index ρ is less than or equal to the first threshold (or less than the first threshold).

Moreover, the low correlation causal relationship estimation unit 130 calculates an index ρ of Y to X, which is the opposite direction. If both the index ρ of X to Y and the index ρ of Y to X are greater than the first threshold (or greater than or equal to the first threshold), the low correlation causal relationship estimation unit 130 further compares a difference between the index ρ of X to Y and the index ρ of Y to X with a second threshold. The low correlation causal relationship estimation unit 130 determines that there is a unidirectional causal relationship of X to Y if the difference is greater than the second threshold (or greater than or equal to the second threshold) and determines that there is a bidirectional causal relationship X to Y and Y to X if the difference is less than or equal to the second threshold (or less than the second threshold). Any other equations may be used as an application method of the CCM without being limited to the specific equations illustrated here.

For example, when there is influence via a third variable that has no direct relation to the variables X and Y, the index ρ may increase due to a spurious correlation. Thus, the low correlation causal relationship estimation unit 130 performs determination of convergence as a determination condition of a causal relationship in order to eliminate the spurious correlation in the index ρ. Specifically, in the determination of convergence, it is determined that there is convergence when the index ρ has dependency on the data length L (data amount) of a measurement value (that is, when the index ρ increases with the data length L of a measurement value and converges to a certain value in a sufficiently long data length L). When the index ρ has no such dependency, it is determined that there is no convergence. When there is no sufficient data length L for the index ρ to converge, dependency can be confirmed based on an increase tendency such that the index ρ increases as the data length L increases. For example, by comparing the index ρ in a case of an extremely short data length L and the index ρ in a case of a longer data length L, the presence or absence of an increase tendency is confirmed, and it is determined that there is dependency when there is an increase tendency.

The low correlation causal relationship estimation unit 130 finally determines that there is a causal relationship between variables X and Y when it is determined that the index ρ has convergence and determines that there is no causal relationship when it is determined that the index ρ has no convergence. Note that the determination of convergence may be performed before the determination of the presence or absence of a causal relationship.

The high correlation causal relationship estimation unit 140 determines a causal relationship by comparing bidirectional polynomial models for a pair of the sensors 111 determined as a high correlation by the correlation determination unit 120. To determine a causal relationship in which the variable X is a cause and the variable Y is a result (that is, X to Y), the high correlation causal relationship estimation unit 140 uses time series data $\{X_t\}$ and $\{Y_t\}$ of sensor values acquired from the sensors 111, generates a polynomial model of the estimation value Y'$_t$ by using Equation (1) described above, and generates a polynomial model of the estimation value X'$_t$ by using the following Equation (5).

[Math. 5]

$$X'_t = h(Y_{t-1}) = \sum_{n=0}^{N} b_n Y_{t-1}^n \qquad (5)$$

Here, Y'$_t$ is an estimation value of Y$_t$, N is an order number, and b is a coefficient. The order number N is set to a suitable value by using cross validation.

The high correlation causal relationship estimation unit 140 calculates an error between the estimation value Y'$_t$ and the estimation value Y$_t$ and calculates an error between the estimation value X'$_t$ and the estimation value X$_t$. The high correlation causal relationship estimation unit 140 then determines that there is a unidirectional causal relationship of X to Y if the error of the estimation value Y'$_t$ is smaller than the error of the estimation value X'$_t$. Further, the high correlation causal relationship estimation unit 140 determines that there is a bidirectional causal relationship of X to Y and Y to X if the error of the estimation value Y'$_t$ and the error of the estimation value X'$_t$ are the same or the substantially the same. A criterion for determining a unidirectional or bidirectional causal relationship is set in any manner. Any other equations may be used as a causal relationship determination method applied to a case of a high correlation without being limited to the specific equations illustrated here.

Figure 5:
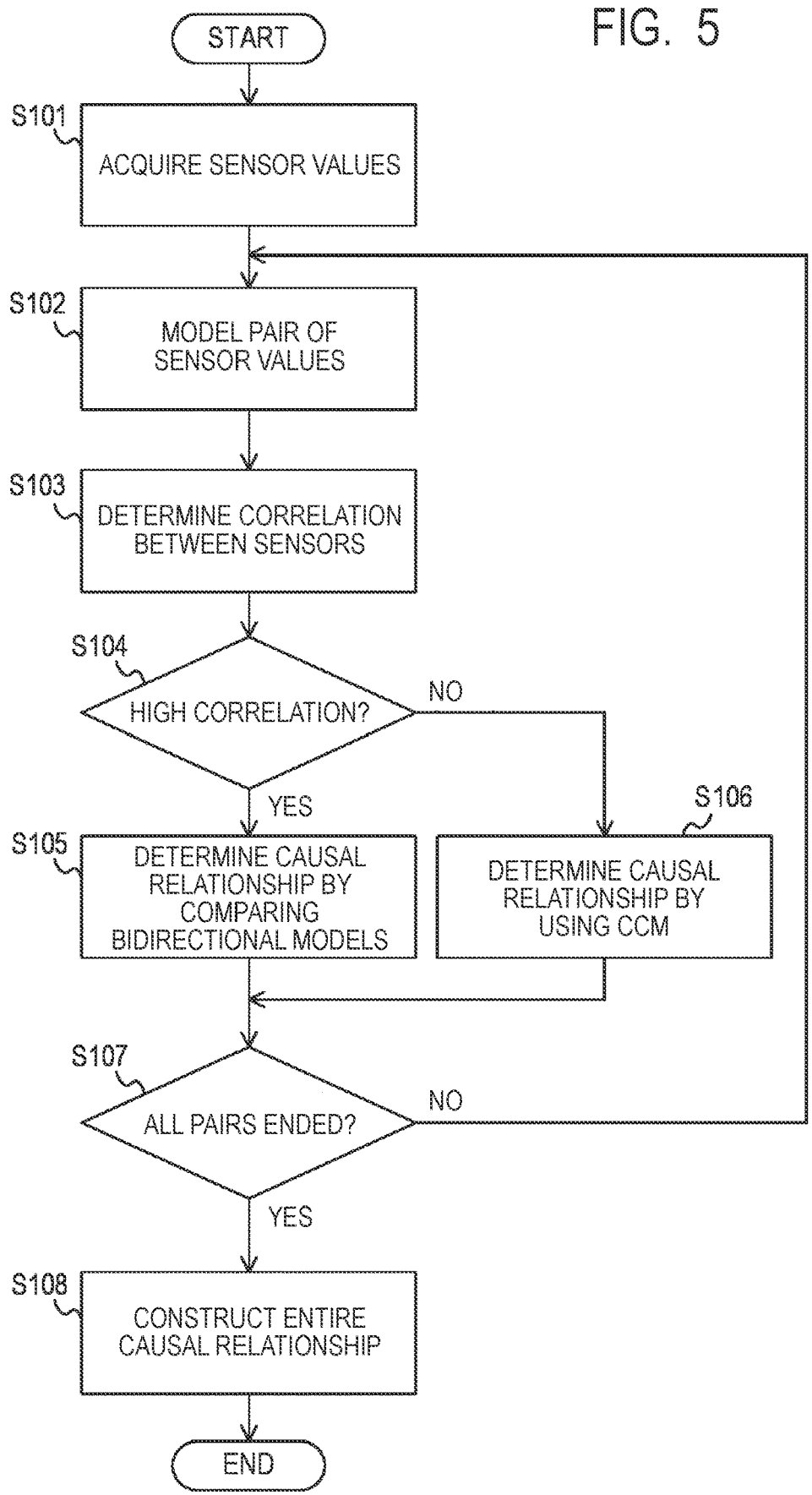
FIG. 5 is a diagram illustrating a flowchart of a causal relationship learning method according to the example embodiment.

FIG. 5 is a diagram illustrating a flowchart of the causal relationship learning method performed in the causal relationship learning device 100 according to the present example embodiment. The causal relationship learning method is started by the user performing a predetermined operation on the causal relationship learning device 100, for example.

First, the sensor value acquisition unit 110 acquires time series sensor values measured by the plurality of sensors 111 (step S101). In this example, sensor values in a normal state where no anomaly occurs in a measured object are to be learned. The sensor value acquisition unit 110 may receive sensor values directly from the sensors 111 or may be read sensor values stored in a storage device.

The correlation determination unit 120 selects a certain pair of two sensors 111 from which sensor values are acquired as a determination target and generates a model in accordance with Equation (1) described above (step S102). The correlation determination unit 120 then determines a correlation between sensor values of the sensors 111 based on an error of the model generated in step S102 (step S103). In this example, the correlation is determined to be high if an error of the model is smaller than a predetermined reference, and the correlation is determined to be low if the error is larger than the predetermined reference.

If it is determined that the correlation is low between the sensors 111 in step S103 (step S104, NO), the low correlation causal relationship estimation unit 130 determines the causal relationship between the sensors 111 by using the CCM in accordance with Equation (2) to Equation (4) described above (step S106). As a result, the presence or absence of a causal relationship and the direction of the causal relationship between the sensors 111 are determined.

If it is determined that the correlation is high between the sensors 111 in step S103 (step S104, YES), the high correlation causal relationship estimation unit 140 determines the causal relationship by comparing bidirectional polynomial models in accordance with Equation (5) described above (step S105). As a result, the presence or absence of a causal relationship and the direction of the causal relationship between the sensors 111 are determined.

If determination of a causal relationship has not yet ended for all the pairs of the sensors 111 (step S107, NO), steps S102 to S107 are repeated for another pair of the sensors 111 as a determination target.

If determination of a causal relationship has ended for all the pairs of the sensors 111 (step S107, YES), the causal relationship construction unit 150 constructs and stores a causal relationship of the entire sensors 111 in the causal relationship storage unit 160 by aggregating causal relationships determined in steps S105 and S106 (step S108).

In the present example embodiment, the CPU 101 of the causal relationship learning device 100 serves as a subject of each step (process) included in the process illustrated in FIG. 5. That is, the CPU 101 reads a program used for performing the process illustrated in FIG. 5 from the memory 102 or the storage device 103, executes the program to control each unit of the causal relationship learning device 100, and thereby performs the process illustrated in FIG. 5. Further, at least a part of the process illustrated in FIG. 5 may be performed by a device or an electric circuit other than the CPU 101 instead of the CPU 101.

Figure 6:
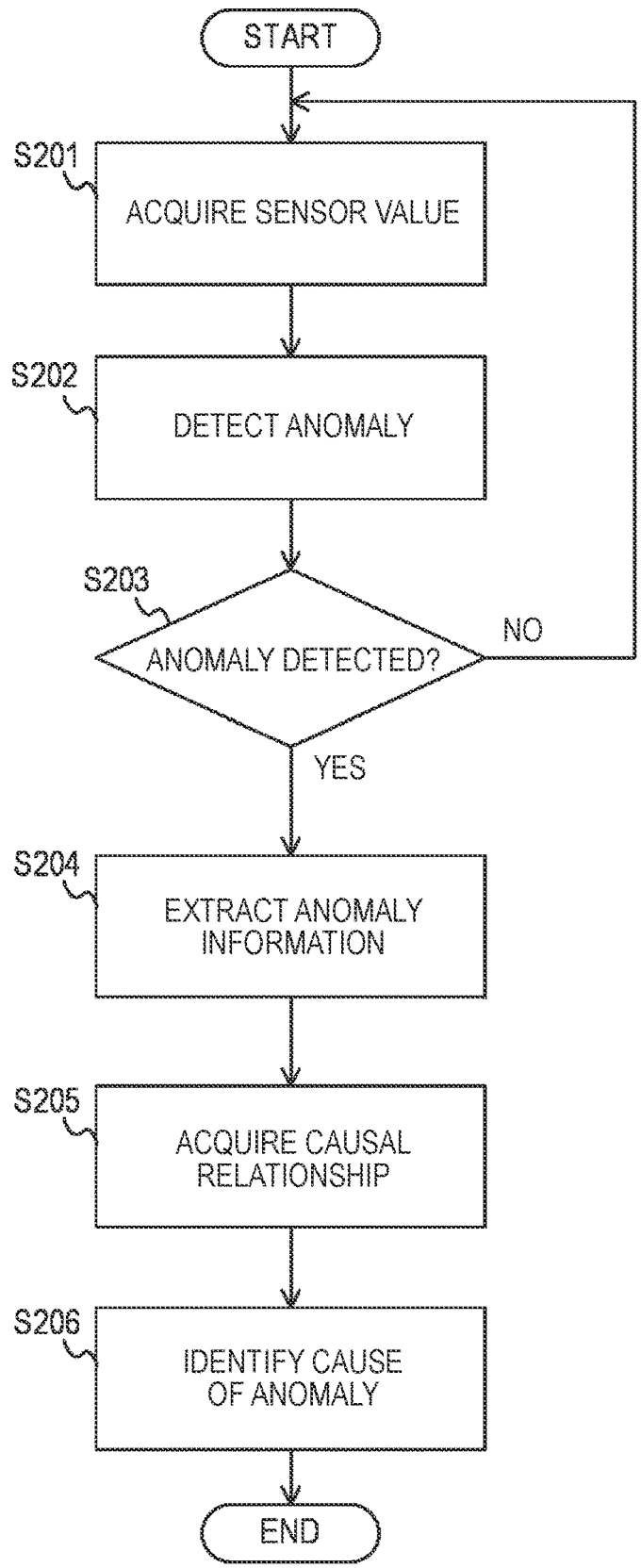
FIG. 6 is a diagram illustrating a flowchart of an anomaly analysis method according to the example embodiment.

FIG. 6 is a diagram illustrating a flowchart of the anomaly analysis method performed in the anomaly analysis device 200 according to the present example embodiment. The anomaly analysis method is started by the user performing a predetermined operation on the anomaly analysis device 200, for example.

First, the sensor value acquisition unit 210 acquires sensor values measured by the sensors 111 (step S201). The sensor value acquisition unit 210 may receive sensor values directly from the sensors 111 or may read sensor values stored in a storage device.

The anomaly detection unit 220 performs detection of anomaly by a well-known anomaly detection method by using the sensor values acquired in step S201 (step S202). Further, an anomaly may be detected by receiving an anomaly detection result from another anomaly analysis system.

If no anomaly is detected in step S202 (step S203, NO), the process returns to step S201, and anomaly detection is repeated. If an anomaly is detected in step S202 (step S203, YES), the anomaly detection unit 220 extracts anomaly information indicating the sensor 111 from which the anomaly is detected and the occurrence time of the anomaly (step S204).

The anomaly cause identifying unit 230 reads, from the causal relationship storage unit 160 of the causal relationship learning device 100, a causal relationship including the sensor 111 from which the anomaly is detected (step S205). The anomaly cause identifying unit 230 then identifies the most upstream sensor 111 in the causal relationship as a cause of the anomaly (step S206). Information indicating the sensor 111 corresponding to the identified cause of the anomaly is output in any method by the anomaly cause output unit 240.

In the present example embodiment, the CPU 201 of the anomaly analysis device 200 serves as a subject of each step (process) included in the process illustrated in FIG. 6. That is, the CPU 201 reads a program used for performing the process illustrated in FIG. 6 from the memory 202 or the storage device 203, executes the program to control each unit of the anomaly analysis device 200, and thereby performs the process illustrated in FIG. 6. Further, at least a part of the process illustrated in FIG. 6 may be performed by a device or an electric circuit other than the CPU 201 instead of the CPU 201.

While the CCM can accurately estimate a causal relationship by estimating a cause variable from a resultant variable in a deterministic system as described above, it may erroneously estimate a causal relationship with respect to variables having a high correlation. The causal relationship learning device 100 according to the present example embodiment learns a causal relationship by using the CCM for a pair of the sensors 111 having a low correlation and learns a causal relationship by using another causal estimation method for a pair of the sensors 111 having a high correlation. With such a configuration, even when there is a relationship of a high correlation in the sensors 111 that is not preferable for the CCM, the estimation accuracy of a causal relationship can be improved as a whole. Further, since the anomaly analysis device 200 identifies a cause of an anomaly by using a causal relationship learned in such a way, the accuracy in anomaly analysis is also improved.

Other Example Embodiments

Figure 7:
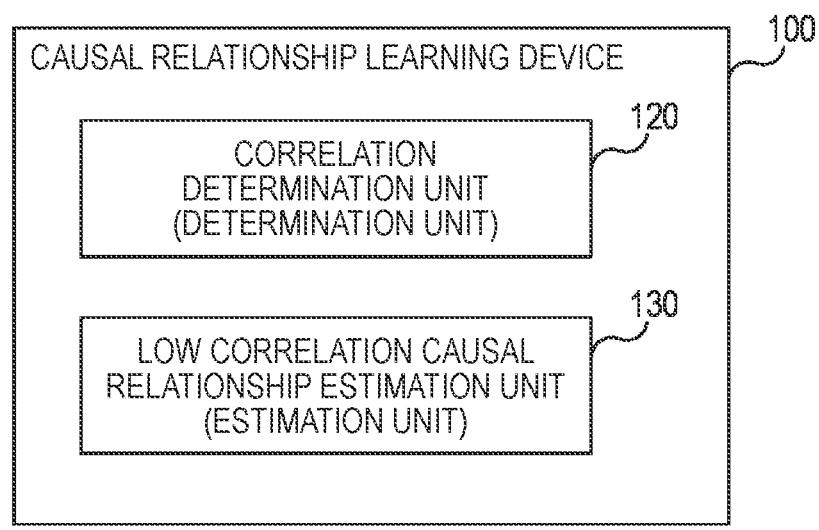
FIG. 7 is a schematic configuration diagram of a causal relationship learning device according to the example embodiment.

FIG. 7 is a general configuration diagram of the causal relationship learning device 100 according to the example embodiments described above. FIG. 7 illustrates a configuration example by which the causal relationship learning device 100 functions as a device that learns a causal relationship between sensors in a deterministic system. The causal relationship learning device 100 has the correlation determination unit 120 (determination unit) that determines a correlation between measurement values measured by two sensors and a low correlation causal relationship estimation unit 130 (estimation unit) that, when the correlation is lower than a predetermined reference, determines a causal relationship between the two sensors by estimating one of the measurement values which is a cause from the other of the measurement values which is a result.

The present invention is not limited to the example embodiments described above and can be properly changed within the scope not departing from the spirit of the present invention.

The scope of each of the example embodiments further includes a processing method that stores, in a storage medium, a program that causes the configuration of each of the example embodiments to operate so as to implement the function of each of the example embodiments described above (more specifically, a causal relationship learning program or an anomaly analysis program that causes a computer to perform the process illustrated in FIG. 5 or FIG. 6), reads the program stored in the storage medium as a code, and executes the program in a computer. That is, the scope of each of the example embodiments also includes a computer readable storage medium. Further, each of the example embodiments includes not only the storage medium in which the program described above is stored but also the program itself.

As the storage medium, for example, a floppy (registered trademark) disk, a hard disk, an optical disk, a magneto-optical disk, a CD-ROM, a magnetic tape, a nonvolatile memory card, or a ROM can be used. Further, the scope of each of the example embodiments includes an example that operates on OS to perform a process in cooperation with another software or a function of an add-in board without being limited to an example that performs a process by an individual program stored in the storage medium.

The whole or part of the example embodiments disclosed above can be described as, but not limited to, the following supplementary notes.

(Supplementary Note 1)

A causal relationship learning device comprising:

a determination unit that determines a correlation between measurement values measured by two sensors; and an estimation unit that, when the correlation is lower than a predetermined reference, determines a causal relationship between the two sensors by estimating one of the measurement values which is a cause from the other of the measurement values which is a result.

(Supplementary Note 2)

The causal relationship learning device according to supplementary note 1 further comprising a second estimation unit that, when the correlation is higher than a predetermined reference, determines the causal relationship by using a different method from the estimation unit.

(Supplementary Note 3)

The causal relationship learning device according to supplementary note 2 further comprising a construction unit that constructs an entire causal relationship by aggregating the causal relationship determined by the estimation unit and the causal relationship determined by the second estimation unit.

(Supplementary Note 4)

The causal relationship learning device according to any one of supplementary notes 1 to 3, wherein the estimation unit estimates the causal relationship by Convergent Cross Mapping (CCM).

(Supplementary Note 5)

The causal relationship learning device according to supplementary note 4, wherein the CCM prepares a predetermined number of neighbor delay vectors close to a delay vector expressing the measured value which is a result, calculates, as an estimation value, a weighted average of delay vectors expressing the measurement values which are causes corresponding to time of the neighbor delay vectors, and determines the causal relationship by a correlation coefficient of the estimation value and the measurement values that are causes.

(Supplementary Note 6)

The causal relationship learning device according to any one of supplementary notes 1 to 5, wherein the determination unit generates a polynomial model from the measurement values of the two sensors and determines the correlation based on an error between an estimation value by the polynomial model and the measurement values.

(Supplementary Note 7)

An anomaly analysis system comprising:

a determination unit that determines a correlation between measurement values measured by two sensors;

an estimation unit that, when the correlation is lower than a predetermined reference, determines a causal relationship between the two sensors by estimating one of the measurement values which is a cause from the other of the measurement value which is a result;

a detection unit that detects an anomaly from the measurement values; and an identifying unit that identifies a sensor which is a cause of the anomaly based on the causal relationship including a sensor from which the anomaly is detected.

(Supplementary Note 8)

A causal relationship learning method comprising:

determining a correlation between measurement values measured by two sensors; and when the correlation is lower than a predetermined reference, determining a causal relationship between the two sensors by estimating one of the measurement values which is a cause from the other of the measurement values which is a result.

(Supplementary Note 9)

A causal relationship learning program that causes a computer to perform:

determining a correlation between measurement values measured by two sensors; and when the correlation is lower than a predetermined reference, determining a causal relationship between the two sensors by estimating one of the measurement values which is a cause from the other of the measurement values which is a result.

The invention claimed is:

1. A causal relationship learning device comprising:
at least one memory configured to store instructions; and
at least one processor configured to execute the instructions, to perform:
determining a correlation between measurement values measured by two sensors; and
determining, in a case that the correlation is lower than a predetermined reference, a causal relationship between the two sensors by estimating one of the measurement values which is a cause from the other of the measurement values which is a result.

2. The causal relationship learning device according to claim 1, the instructions further comprising:
determining, in a case that the correlation is higher than a predetermined reference, the causal relationship by different method from the estimating.

3. The causal relationship learning device according to claim 2, the instructions further comprising:
constructing an entire causal relationship by aggregating the causal relationship determined in a case that the correlation is lower than a predetermined reference and the causal relationship determined in a case that the correlation is higher than a predetermined reference.

4. The causal relationship learning device according to claim 1, wherein the estimating of the causal relationship is performed by Convergent Cross Mapping (CCM).

5. The causal relationship learning device according to claim 4, wherein the CCM prepares a predetermined number of neighbor delay vectors close to a delay vector expressing the measured value which is a result, calculates, as an estimation value, a weighted average of delay vectors expressing the measurement values which are causes corresponding to time of the neighbor delay vectors, and determines the causal relationship by a correlation coefficient of the estimation value and the measurement values that are causes.

6. The causal relationship learning device according to claim 1, wherein the determining of the correlation includes generating a polynomial model from the measurement values of the two sensors and determining the correlation based on an error between an estimation value by the polynomial model and the measurement values.

7. An anomaly analysis system comprising:
- a determination unit comprising a first memory configured to store first instructions and a first processor configured to execute the first instructions;
- an estimation unit comprising a second memory configured to store second instructions and a second processor configured to execute the second instructions;
- a detection unit comprising a third memory configured to store third instructions and a third processor configured to execute the third instructions;
- an identifying unit comprising a fourth memory configured to store fourth instructions and a fourth processor configured to execute the fourth instructions, wherein
- the first processor is configured to execute the first instructions to determine a correlation between measurement values measured by two sensors;
- the second processor is configured to execute the second instructions to determine, in a case that the correlation is lower than a predetermined reference, a causal relationship between the two sensors by estimating one of the measurement values which is a cause from the other of the measurement value which is a result;
- the third processor is configured to execute the third instructions to detect an anomaly from the measurement values; and
- the fourth processor is configured to execute the fourth instructions to identify a sensor which is a cause of the anomaly based on the causal relationship including a sensor from which the anomaly is detected.

8. A causal relationship learning method comprising:
- determining a correlation between measurement values measured by two sensors; and
- determining, in a case that the correlation is lower than a predetermined reference, a causal relationship between the two sensors by estimating one of the measurement values which is a cause from the other of the measurement values which is a result.

9. A non-transitory computer-readable storage medium configured to store at least one causal relationship learning program for causing at least one computer to perform:
- determining a correlation between measurement values measured by two sensors; and
- determining, in a case that the correlation is lower than a predetermined reference, a causal relationship between the two sensors by estimating one of the measurement values which is a cause from the other of the measurement values which is a result.

* * * * *